US006892627B2

(12) United States Patent
Lalanne-Eygun

(10) Patent No.: US 6,892,627 B2
(45) Date of Patent: May 17, 2005

(54) FILTER COFFEE MAKER WITH DISTRIBUTION OF HOT WATER IN THE LID

(75) Inventor: Jacques Lalanne-Eygun, Beaucens (FR)

(73) Assignee: SEB S.A., Ecully (FR)

( * ) Notice: Subject to any disclaimer, the term of this patent is extended or adjusted under 35 U.S.C. 154(b) by 0 days.

(21) Appl. No.: 10/860,020

(22) Filed: Jun. 4, 2004

(65) Prior Publication Data
US 2004/0244600 A1 Dec. 9, 2004

(30) Foreign Application Priority Data

Jun. 6, 2003 (FR) .............................................. 03 06858

(51) Int. Cl.[7] .................................................. A47J 31/00
(52) U.S. Cl. ........................... 99/285; 99/293; 99/294; 99/299; 99/304; 99/306; 99/307
(58) Field of Search ......................... 99/495, 516, 275, 99/279, 284, 285, 289 R–315, 323, 323.1, 323.3

(56) References Cited

U.S. PATENT DOCUMENTS

| | | | | |
|---|---|---|---|---|
| 4,100,394 A | * | 7/1978 | Tilp ............................ | 392/471 |
| 4,103,603 A | | 8/1978 | Bergmann et al. | |
| 4,155,291 A | * | 5/1979 | Ryckman et al. ............. | 99/282 |
| 4,414,884 A | * | 11/1983 | McLean ....................... | 99/304 |
| 4,634,838 A | * | 1/1987 | Berz ........................... | 392/445 |
| 4,825,759 A | * | 5/1989 | Grome et al. .................. | 99/307 |
| 5,083,504 A | * | 1/1992 | Koga et al. ............... | 99/302 R |
| 5,103,603 A | * | 4/1992 | Verby et al. .................... | 52/72 |
| 5,165,327 A | * | 11/1992 | Ferrara, Jr. .................. | 99/307 |
| 5,539,856 A | * | 7/1996 | Andrew et al. ............. | 392/467 |
| 5,862,738 A | * | 1/1999 | Warne .......................... | 99/281 |
| 5,868,062 A | * | 2/1999 | Enomoto ...................... | 99/282 |
| 5,901,635 A | * | 5/1999 | Lucas et al. .................. | 99/283 |
| 5,964,143 A | * | 10/1999 | Driscoll et al. ............... | 99/299 |

FOREIGN PATENT DOCUMENTS

| | | |
|---|---|---|
| DE | 69 25 291 U | 9/1970 |
| FR | 2 685 861 A | 7/1993 |

* cited by examiner

Primary Examiner—Timothy F. Simone
(74) Attorney, Agent, or Firm—Browdy and Neimark, P.L.L.C.

(57) ABSTRACT

A filter coffee maker having: a boiler; a case in which the boiler is disposed; an ascending conduit coupled to the boiler for upward movement of the hot water produced by said boiler; a filter holder or filter holder housing; a lid pivoted on the case; and a water delivery head arranged in the lid. The delivery head has an inlet opening brought into communication with a hot water outlet orifice of the conduit and an outlet opening that opens above the filter holder or housing when the lid is closed. The lid has a lower face presenting a protuberance in which the inlet opening is arranged, the ascending conduit has an upper end with a closed upper part, and the orifice opens in a direction facing a lateral wall forming part of the case.

21 Claims, 5 Drawing Sheets

FILTER COFFEE MAKER WITH DISTRIBUTION OF HOT WATER IN THE LID

CROSS REFERENCE TO RELATED APPLICATION

This application relates to subject matter disclosed in a copending U.S. application entitled FILTER COFFEE MAKER WITH LOCKING DEVICE FOR PIVOTABLE FILTER HOLDER filed by Dominguez et al on or about the same date as the present application and claiming priority rights based on French Application No. 03 06863. The disclosures of the above-cited U.S. and French applications are incorporated herein by reference.

BACKGROUND OF THE INVENTION

The present invention relates to the general technical field of machines for preparing hot beverages such as filter coffee makers and concerns more particularly appliances having a lid containing a hot water distribution conduit.

The German patent document DE 6925291 U discloses a filter coffee maker having a conduit for distribution of hot water comprising a first part arranged in a case and a second part arranged in a lid that is pivotably mounted on the case. The upper end of the part of the conduit arranged in the case has a joint. The part of the conduit arranged in the lid opens above the filter holder. This arrangement facilitates insertion and removal of the filter. However, this form of construction presents a risk of ejection of hot water from the appliance if the lid is opened during operation.

BRIEF SUMMARY OF THE INVENTION

The present invention provides a novel filter coffee maker that eliminates the above-cited risk while retaining a simple structure.

To this end, the present invention provides a filter coffee maker having a boiler arranged in a case connected to an ascending conduit for upward movement of the hot water, the conduit having a hot water outlet orifice. The coffee maker further has a lid pivoted on the case and a delivery head arranged in the lid, the delivery head having an inlet opening brought into communication with the orifice and an outlet opening that opens above a filter holder when the lid is closed down on the case. The lid has a lower face presenting a protuberance in which the inlet opening is arranged, wherein the ascending conduit has an upper end that is closed at its upper part and the orifice opens facing a lateral wall forming part of the case. This arrangement permits the drawback cited above to be avoided. This arrangement presents good safety due to the fact that the lateral wall functions as a deflector that forms part of the case. This construction is more reliable than a movable lateral wall belonging to the lid, or than a lateral wall belonging to a part that is movable with respect to the case, which is prone to being damaged so that it would no longer perform its function. This structure is also simpler to assemble.

According to an advantageous form of construction, the coffee maker has a water reservoir supplying the boiler. Alternatively, the coffee maker can be connected to a water supply.

The water reservoir can be arranged in the case. Advantageously then, the ascending conduit can be disposed partially in the water reservoir. Alternatively, the water reservoir can be disposed outside of the case and/or can be removable from the case.

According to another advantageous form of construction, the filter holder is arranged in the case and can be fixed to the case or be disposed in a filter holder housing disposed in the case. Alternatively, the filter holder can be arranged outside of the case.

Advantageously, the ascending conduit has an upper inner wall that is inclined downwardly in the direction of the orifice. This arrangement permits the jet of hot water coming from the ascending conduit to be directed in a better manner.

Also advantageously, the upper end of the ascending conduit is located at the level of an upper wall of the case. This arrangement facilitates the connection with the spray head arranged in the lid, while avoiding the presence of a projecting part on the upper wall of the case.

Also advantageously, for better sealing, the protuberance has a lip seal arranged around the inlet opening and covering the top of the ascending conduit that contains the orifice, when the lid occupies a closed position on the case.

According to an advantageous form of construction, the case has an upper face formed at least partially by a support. This arrangement provides an upper face that is easy to clean and allows the support to be used for storage of the appliance.

According to another advantageous form of construction, the orifice is formed in a hood, forming a unit with the case, the hood being mounted on a hot water riser tube, the hood and the tube belonging to the ascending conduit. This arrangement permits thermal expansion of the tube without affecting the case.

Also advantageously, the hood can be fixed to the support.

A movable deflector can be mounted against a restoring means around the upper end of the ascending conduit. This arrangement allows a better protection against ejection of hot water when the lid is lifted during operation of the coffee maker.

Advantageously then, the movable deflector can be mounted against the restoring means around the hood.

Also advantageously, the upper and of the movable deflector is situated at the level of an upper wall of the case. This arrangement permits avoidance of attracting the attention of the user and also facilitates cleaning of the upper part of the case.

According to one form of construction, the support has a well, or shaft, in which is arranged the upper extremity of the ascending conduit. This permits better protection of the upper end of the ascending conduit.

Advantageously, the lateral wall forms a unit with the support. In particular, the lateral wall can form a unit with the well.

According to an advantageous arrangement, the hood has a wall that descends into the water reservoir and that presents a cutout. A float is mounted around the hot water riser tube and a tongue forming part of the float slides in the cutout. This arrangement permits an indication of the water level to be provided without requiring a transparent lateral wall.

According to another advantageous arrangement, the orifice is arranged to face the side where the lid pivots on the case. This permits better safety by preventing a jet of water from being directed toward the user.

According to another advantageous arrangement, the distance between the orifice and the lateral wall is less than 1 cm, and preferably less than 0.7 cm. This arrangement helps to prevent the user from easily being exposed to the hot water jet coming from the ascending conduit.

DETAILED DESCRIPTION OF THE INVENTION

Figure 1:
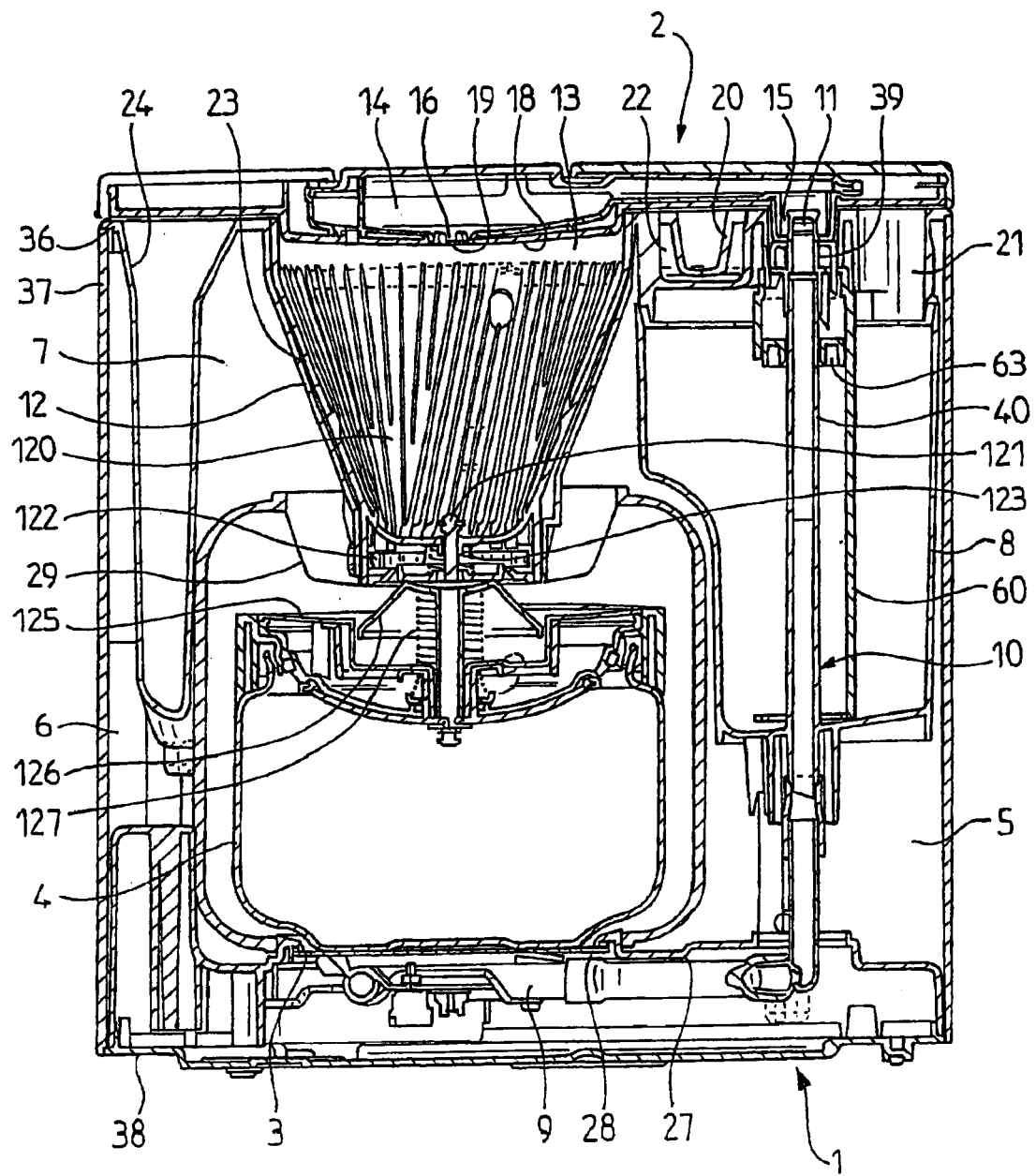
FIG. 1 is an elevational, cross-sectional view of a coffee maker according to one embodiment of the present invention.

The filter coffee maker illustrated in FIG. 1 has a case 1 closed by a lid 2. Case 1 has a pedestal 3 for receiving a coffee pot, or carafe, 4. Case 1 provides a first post, or upright, 5, at one side and second post, or upright, 6 at the other side of base 3. First post 5 and second post 6 are connected by an arch 7 above base 3. A water reservoir 8 is arranged in case 1 and is connected to a boiler 9 provided in case 1. This connection is not specifically shown, but conforms to conventional practice in this art. Water reservoir 8 is arranged partially in first post 5. Boiler 9 is disposed in pedestal 3 and is connected to an ascending conduit 10 through which boiled water rises.

Ascending conduit 10 is provided in its upper part with a hot water outlet orifice 11 and a part of conduit 10 passes through water reservoir 8. Case 1 further includes a filter holder housing 12 and a filter holder 13. Housing 12 is formed in arch 7. Filter holder 13 is disposed in housing 12 and a water delivery head 14 is arranged in lid 2. Delivery head 14 has an inlet opening 15 communicating with an outlet opening 16. Ascending conduit 10 is connected to inlet opening 15 when lid 2 closes case 1, at which time outlet opening 16 is disposed above filter holder 13.

Filter holder 13 includes a filter cone 120 provided with internal grooves, a lower flow blocking valve 121 and holding means 122. Valve 121 is associated with a restoring, or biasing, means 123. Carafe 4 has an upper closing part 125 provided with a filling valve 126 cooperating with valve 121 when carafe 4 is in place on pedestal 3. Filling valve 126 is associated with another restoring, or biasing, means 127.

Figure 2:
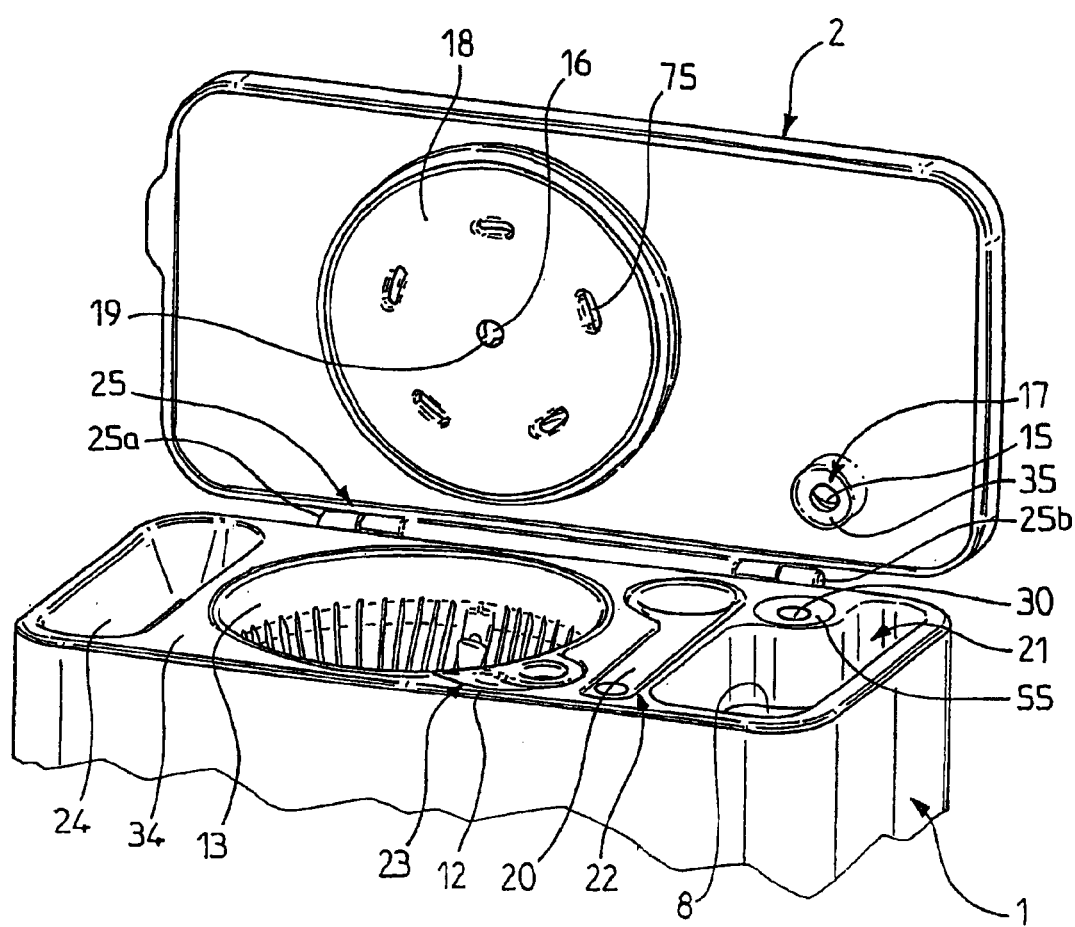
FIG. 2 is a perspective view of the upper portion of the embodiment of FIG. 1, with the lid raised.

As shown more clearly in FIG. 2, lid 2 is pivoted on case 1 and water reservoir 8 is open at its upper end. The lower face of lid 2 is provided with a protuberance 17 in which inlet opening 15 is formed. The lower face of lid 2 is further provided with a boss 18 having an opening 19 aligned with opening 16 of delivery head 14 to allow flow of hot water from head 14.

At the upper face of case 1, there is provided a filling opening, or mouth, 21 that is located above reservoir 8 and is formed in first post 5. An accessory housing 22 is also formed in the upper face of case 1 alongside filling opening 21. Housing 22 is provided to receive a coffee measure 20 and is arranged in arch 7 above water reservoir 8. A compartment 23 is also formed in the upper face of case 1 alongside accessory housing 22 and forms filter holder housing 12. Compartment 23 is arranged in arch 7 above the location of carafe 4. A compartment 24 for storing a supply of spare filters is also arranged in the upper face of case 1 alongside compartment 23. Housing 24 is arranged in second post 6.

Figure 3:
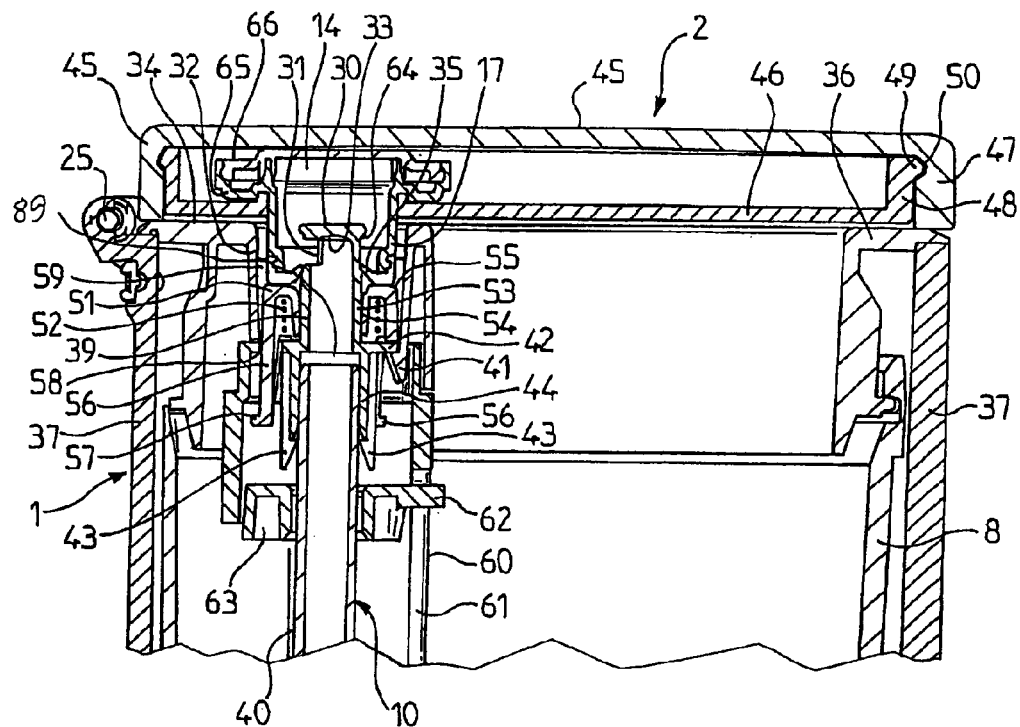
FIG. 3 is an elevational, cross-sectional detail view of the upper portion of the embodiment of FIG. 1, with the lid closed, taken along the plane represented by line III—III in FIG. 1.

As shown more clearly in FIG. 3, ascending conduit 10 has an upper end 30 that is closed at its top and an orifice 31 that faces a lateral wall 32 of case 1. More particularly, ascending conduit 10 has an upper internal wall 33 inclined downwardly in the direction of the direction of orifice 31 and orifice 31 is constituted by a side opening. Upper end 30 of conduit 10 is situated at the level of an upper wall 34 of case 1 and wall 34 forms a part of the upper face of case 1. Upper wall 34 is preferably flat. Lower protuberance 17 has a joint 35 that forms a lip seal. Joint 35 is arranged around inlet opening 15 of delivery head 14 and joint 35 forms the lower part of lower protuberance 17.

The upper face of case 1 is also defined by a support 36 that forms a unit with lateral wall 32. Opening 21, accessory housing 22, compartment 23 and spare filter housing 24 are formed in support 36. Water reservoir 8 is maintained between support 36 and a part 27 that is assembled to support 36 by means of screws (not shown). Part 24 also serves to support a heating plate 28 in contact with boiler 9. Support 36 is mounted on a skirt 37 and the lower part of skirt 37 is closed by a base 38, shown in FIG. 1. Base 38 is assembled with part 27 by means of screws (not shown). A dish, or bowl, 29 is suspended from a lower wall of support 36 above heating plate 28 and is provided to receive the lower part of filter holder housing 12.

Orifice 31 of ascending conduit 10 is formed in a hood 39 that is fixed to case 1. Hood 39 is mounted on a hot water riser tube 40 that forms a part of conduit 10 and that is made, for example, of polypropylene. Tube 40 advantageously extends from the bottom of water reservoir B. Hood 39 forms; along with tube 40, part of ascending conduit 10. Hood 39 is fixed to support 36. More particularly, support 36 has elastic hooks 41, one of which is seen in FIG. 3, that engage with a collar 42 of hood 39, as well as other elastic hooks 43 that engage with a lower tubular part 44 of hood 39. Tubular part 44 is disposed beneath collar 42 and fits around tube 40 with an end clearance 89. This arrangement permits thermal expansion of tube 40.

Lid 2 has an upper wall 45 that is pivotably mounted to skirt 37, for example by pivot elements 25 as shown in FIG. 3. Specifically, as shown in FIG. 2, upper wall 45 of lid 2 is coupled to skirt 37 by hinges 25a and 25b. As shown in FIG. 3, orifice 31 is located to face toward the pivot connection between lid 2 and case 1 and the pivot connection 25 is adjacent to both filling opening, or mouth, 21 and spare filter housing 24.

Upper wall 45 of lid 2 is assembled to a lower wall 46 of lid 2 and upper wall 45 has a downwardly extending peripheral edge 47. Lower wall 46 has an upwardly extending peripheral edge 48. Lugs 49 provided on the outer face of peripheral edge 48 are provided to cooperate with notches 50 provided on the inner face of peripheral edge 47.

Referring to FIG. 3, a movable deflector 51 is mounted against a restoring, or biasing, means 52, such as a spring, disposed around the upper end of conduit 10. More particularly, movable deflector 51 is mounted against restoring means 52 around hood 39. Restoring means 52 is formed, for example, by a helical spring.

Hood 39 has a hollow cylindrical upper part 53 communicating with a lower tubular part 44. Orifice 31 is formed in upper cylindrical part 53. Movable deflector 51 has guide tongues 54 that are slidable around upper cylindrical part 53 of hood 39. Guide tongues 54 extend from an annular upper face 55 of movable deflector 51. Annular upper face 55 is mounted around upper cylindrical part 53 of hood 39. Guide tongues 54 have a width that is less than that of orifice 31. This assures that orifice 31 will not be completely blocked when deflector 51 is in its raised position. Movable deflector 51 also has retaining tongues 56 furnished with hooks 57 and mounted in openings 58 of hood 39. Openings 58 permit return of water into reservoir 8.

FIG. 1 shows movable deflector 51 in its raised position with upper face 55 essentially level with upper wall 34 of housing 1. Joint 35, which is clearly shown in FIG. 1, has an annular lip arranged around upper cylindrical part 53 of hood 39 to assure a good seal with upper cylindrical part 53 when lid 2 is lowered.

Support 36 has a well 59 in which is arranged the upper end 30 of ascending conduit 10. Lateral wall 32 of case 1 is disposed in well 59.

Hood 39 has a wall 60 that extends downwardly into water reservoir 8. Wall 60 has a cutout 61 in which slides a tongue 62 of a float 63 mounted around hot water riser tube 40.

Figure 4:
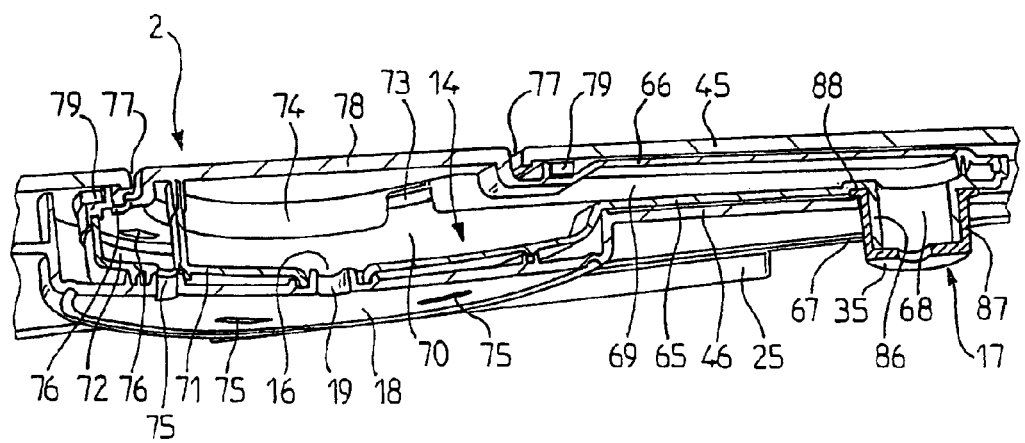
FIG. 4 is a cross-sectional detail view of a portion of the lid of the embodiment of FIG. 1.

Delivery head 14 is housed between the upper and lower walls of lid 2 and, as shown in particular in FIG. 4, head 14 includes a channel 65 and a cover 66. Channel 65 has a lower tubular part 86 forming part of protuberance 17. For this purpose, lower wall 46 of lid 2 has a passage 67. Joint 35 has a tubular post 87 mounted around lower tubular part 86.

FIGS. 3 and 4 show, respectively, first and second possible forms of construction for joint 35. In FIG. 4, joint 35 has a tubular post 87 mounted around lower tubular part 86 of lower protuberance 17 of delivery head 14.

Joint 35 also has an upper collar 88 that is held against channel 65 and lower wall 46 of lid 2. Lower boss 18 forms part of lower wall 46.

Delivery head 14 comprises an inlet chamber 68, formed in protuberance 17, opening laterally at its top toward a conduit 69 that performs water-steam separation. Conduit 69 descends slightly and opens into the lateral wall of an outlet chamber 70. Outlet chamber 70 has in its lower part a bowl 71. Opening 16 is arraigned at the center of bowl 71. A steam evacuation chamber 72 is arranged around outlet chamber 70 and steam passages 73 are provided in the upper part of outlet chamber 70. More particularly, steam passages 73 are provided in an internal wall of cover 66. Steam evacuation chamber 72 has steam inlet openings 75 formed in lower wall 46 and channel 65. Steam evacuation chamber 72 has steam outlet openings 76 provided in cover 66. Upper wall 45 has a cutout 77 in which is arranged an upper boss 78 of cover 66. Upper boss 78 and upper wall 45 are substantially at the same level. An annular sealing joint 79 is arranged between cover 66 and upper wall 45 around upper boss 78, steam outlet openings 76 and cutout 77.

Figure 5:
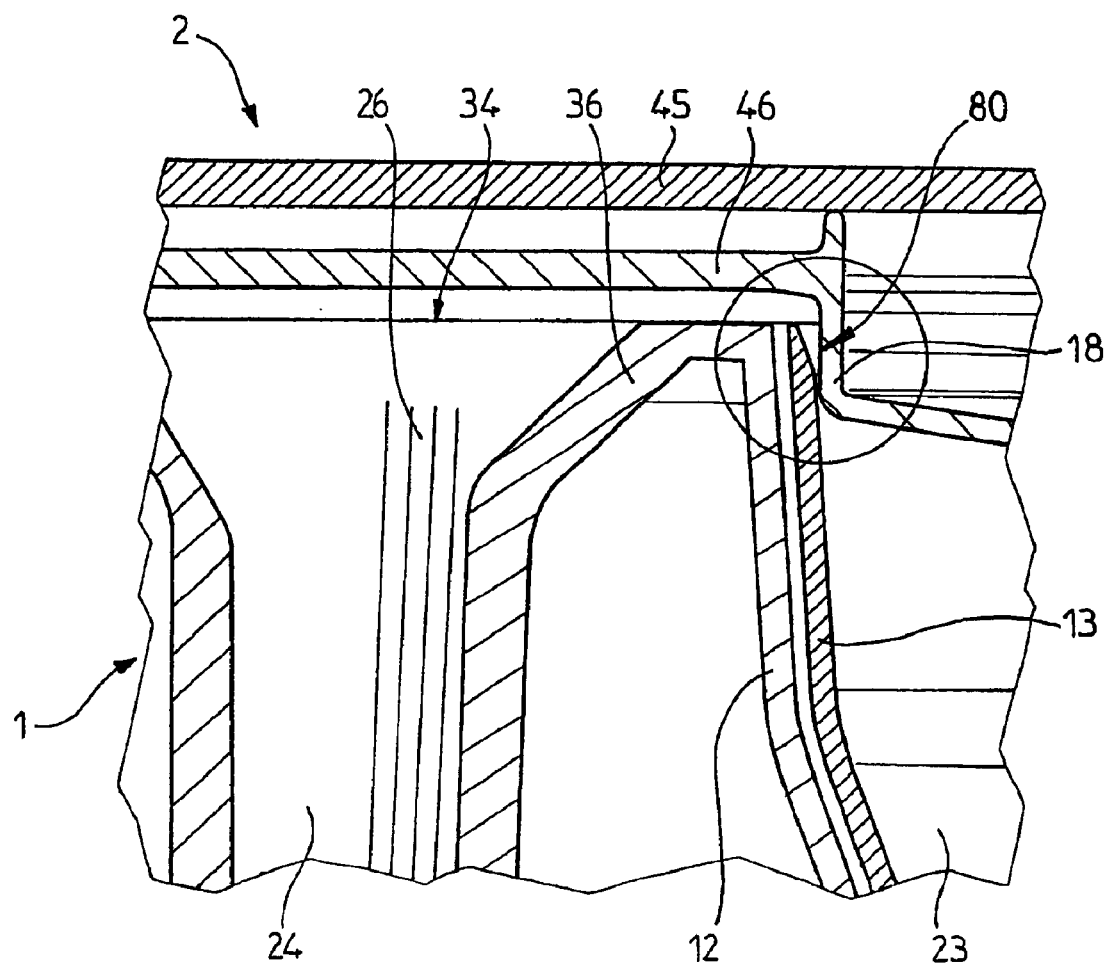
FIG. 5 is a cross-sectional detail view of an upper part of the embodiment of FIG. 1.

FIG. 5 shows the upper part of the coffee maker in the region of compartment 23 and of spare filter housing 24 arranged to hold paper filters 26. Delivery head 14 is not shown in FIG. 5. An annular water retention zone 80 is arranged between the upper part of case 1 and the lower part of lid 2. Housing 24, accessory housing 22 and opening 21, seen in FIG. 2, are arranged outside of annular zone 80.

Figure 6:
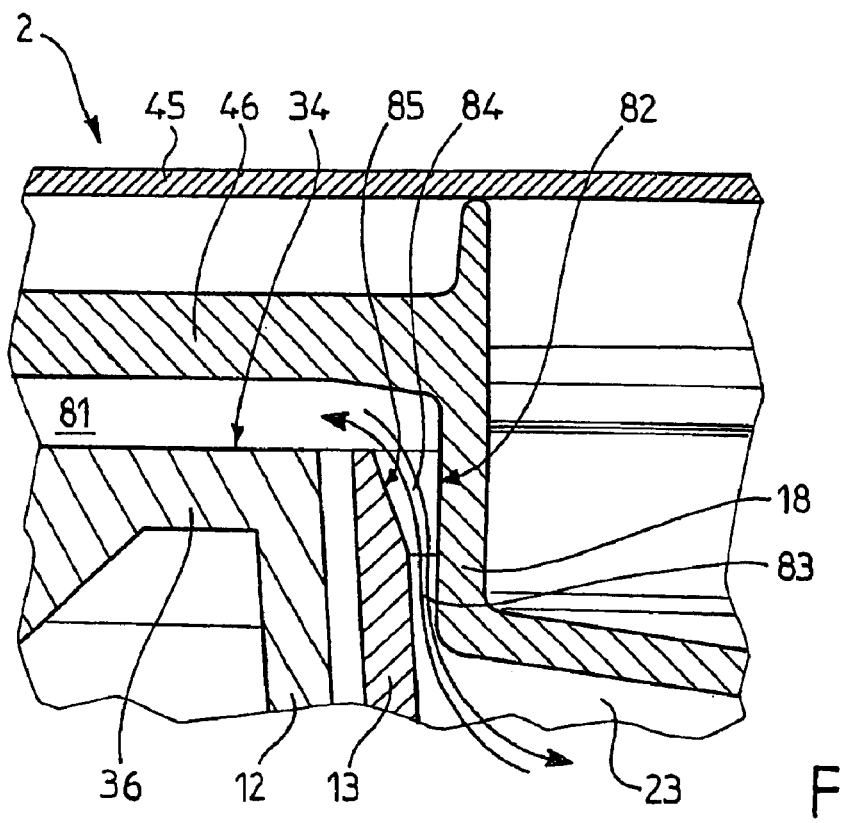
FIG. 6 is a cross-sectional detail view of the portion of FIG. 5 that is delimited by a circle VI, before the coffee maker is placed into operation.
Figure 7:
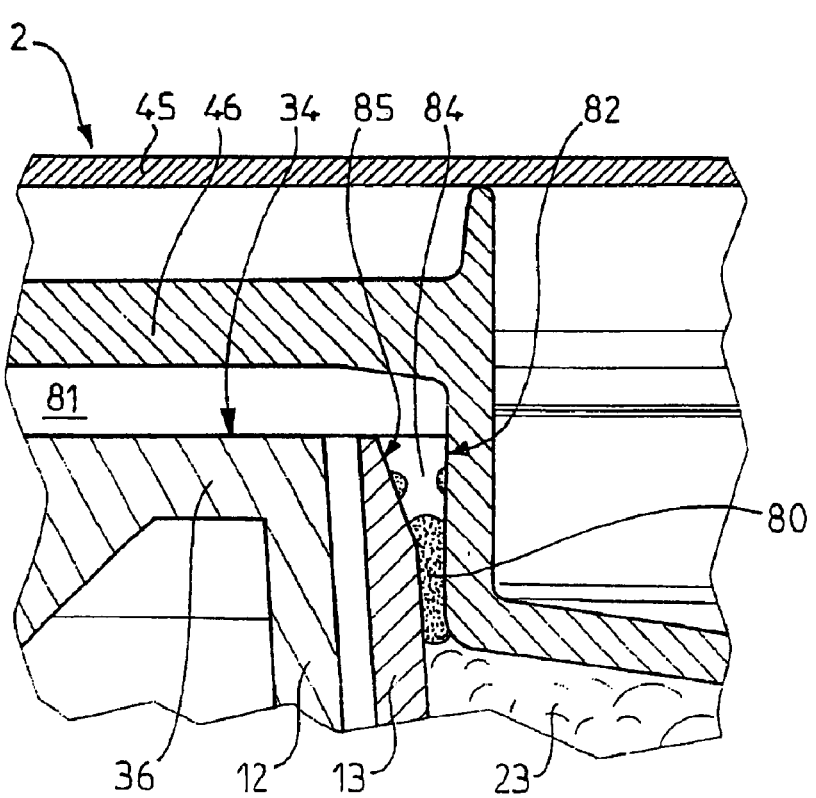
FIG. 7 is a view similar to that of FIG. 6 during operation of the coffee maker.

As is better seen in FIGS. 6 and 7, annular zone 80 is arranged between lower boss 18 of lid 2 and the inner wall of filter holder 13. When lid 2 is closed, a space 81 remains between upper wall 34 of case 1 and lower wall 46 of lid 2. Boss 18 has the form of a cylindrical shoulder 82 that penetrates with play into the upper part of housing 12 in which filter holder 13 is placed.

In order to assure a good adhesion of water droplets, inner boss 18 and/or the upper part of filter holder 18 are made of a material that has good wettability, preferably greater than 0.04 N/m. Rough surfaces, obtained for example by graining, or even frosting, can provide improved wettability. Filter holder 13 is for example made of polypropylene and inner wall 46 of lid 2 is for example made of polycarbonate.

An annular stack, or channel, 83 is thus provided between cylindrical shoulder 82 of boss 18 and the inner wall of filter holder 13. A pressure reducing chamber 84 is provided in the upper part of annular stack 83. Chamber 84 is obtained by a chamfer 85 on the peak of the inner wall of filter holder 13.

The coffee maker according to the invention functions in the following manner.

When lid 2 is in its closed position on case 1, as shown in FIGS. 1 and 3, inlet opening 15 of delivery head 14 is brought into communication with hot water outlet orifice 11 of ascending tube 10 and outlet opening 16 of head 14 opens above filter holder housing 12. Lower protuberance 17 pushes movable deflector 51 down and joint 35 arranged around inlet opening 15 caps upper end 30 of ascending conduit 10, and thus also orifice 31. Hot water coming from ascending conduit 10 is transferred into head 14 without flowing into reservoir 8 due to the sealing action of joint 35. Hot water and steam are separated in conduit 69 and outlet chamber 70. Hot water exits thorough opening 16. Steam coming from boiler 9 escapes through vapor passages 73 to reach steam evacuation chamber 72. Steam coming from filter holder housing 12 reenters through steam inlet openings 75 in order to reach steam evacuation chamber 72. Steam collected in chamber 72 exits through steam outlet openings 76.

When lid 2 occupies its open position with respect to case 1, as shown in FIG. 2, the upper end of movable deflector 51 is located at the level of an upper wall of case 1. Upward movement of deflector 51 is halted by a chamfered annular abutment 64 arranged between upper end 30 of ascending conduit 10 and orifice 31. This arrangement prevents flow of hot water out of case 1. Hot water coming from orifice 31 flows into well 59. Openings 58 of hood 39 are larger than the cross section of retaining tongues 54 and permit the return of water into reservoir 8.

The user can then lift lid 2 without risk of being struck by hot water. In addition, since orifice 31 is disposed to face lateral wall 32 of case 1, failure of movable deflector 51, such as by being blocked in its lowered position, does not adversely affect the safety of the appliance.

According to one possible variation, the upper face of case 1 could be formed only partially by support 36.

According to another possible variation, water reservoir 8 can be disposed outside of case 1 and/or be removable from case 1.

As an alternative to the embodiment illustrated herein, the filter holder could be eliminated and a reusable filter (e.g. a "gold" filter) could be used in place of disposable filters. Preferably then, if the filter holder is eliminated, the filter holder housing may be constructed to directly receive the reusable filter.

This application relates to subject matter disclosed in French Application number FR 03 06858, filed on Jun. 6, 2003, the disclosure of which is incorporated herein by reference.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A filter coffee maker comprising:

a boiler;

a case in which said boiler is disposed;

an ascending conduit coupled to said boiler for upward movement of the hot water produced by said boiler, said conduit having a hot water outlet orifice;

filter holder means;

a lid pivoted on said case; and a water delivery head arranged in said lid, said delivery head having an inlet opening brought into communication with said orifice and an outlet opening that opens above said filter holder means when said lid is in a closed position on said case, wherein said lid has a lower face presenting a protuberance in which said inlet opening is arranged, said ascending conduit has an upper end with a closed upper part, and said orifice opens in a direction facing a lateral wall forming part of said case.

2. The coffee maker of claim 1, further comprising a water reservoir connected to supply water to said boiler.

3. The coffee maker of claim 2, wherein said reservoir is housed in said case.

4. The coffee maker of claim 3, wherein said ascending conduit is disposed partially in said reservoir.

5. The coffee maker of claim 1, wherein said filter holder means is housed in said case.

6. The coffee maker of claim 1, wherein said ascending conduit has an upper inner wall that is inclined downwardly in the direction of said orifice.

7. The coffee maker of claim 1, wherein said case has an upper wall and said upper end of said ascending conduit is located at the level of said upper wall of said case.

8. The coffee maker of claim 1, wherein said protuberance has a lip seal arranged around said inlet opening and covering said upper end of said ascending conduit and said orifice when said lid occupies a closed position on said case.

9. The coffee maker of claim 1, wherein said case has a support forming at least part of an upper face of said case.

10. The coffee maker of claim 9, wherein said support has a well in which is arranged said upper end of said ascending conduit.

11. The coffee maker of claim 9, wherein said lateral wall forms a unit with said support.

12. The coffee maker of claim 1, wherein said ascending conduit comprises a hot water riser tube and a hood mounted on said tube, said orifice is formed in said hood, and said hood forms a unit with said case.

13. The coffee maker of claim 12, wherein said case has a support forming at least part of an upper face of said case and forming a unit with said lateral wall, and said hood is fixed to said support.

14. The coffee maker of claim 12, further comprising: a movable deflector; and a biasing means cooperating with said deflector and positioned around said hood.

15. The coffee maker of claim 14, further comprising: a movable deflector; and a biasing means cooperating with said deflector and positioned around said hood.

16. The coffee maker of claim 12, wherein said hood has a wall that descends into the water reservoir and that presents a cutout, and said coffee maker further comprises a float mounted around said hot water riser tube and a tongue that forms part of said float and that is slidable in said cutout.

17. The coffee maker of claim 1, further comprising: a movable deflector; and a biasing means cooperating with said deflector and positioned around said upper end of said ascending conduit.

18. The coffee maker of claim 17, wherein said movable deflector has an upper and situated at the level of an upper wall of said case.

19. The coffee maker of claim 1, wherein said orifice is arranged to direct water toward the side of said case where said lid is pivoted.

20. The coffee maker of claim 1, wherein said orifice is at a distance of less than 1 cm from said lateral wall.

21. The coffee maker of claim 20, wherein the distance between said orifice and said lateral wall is less than 0.7 cm.

* * * * *